(12) United States Patent
Talwar et al.

(10) Patent No.: US 11,159,328 B2
(45) Date of Patent: Oct. 26, 2021

(54) DIGITAL DOCUMENT EDITING AS PART OF ELECTRONIC SIGNATURE COLLECTION

(71) Applicant: Adobe Inc., San Jose, CA (US)

(72) Inventors: Damanjyot Singh Talwar, Faridabad (IN); Anurag Gupta, Ghaziabad (IN); Anup, Noida (IN)

(73) Assignee: Adobe Inc., San Jose, CA (US)

( * ) Notice: Subject to any disclaimer, the term of this patent is extended or adjusted under 35 U.S.C. 154(b) by 672 days.

(21) Appl. No.: 16/014,828

(22) Filed: Jun. 21, 2018

(65) Prior Publication Data

US 2019/0394045 A1 Dec. 26, 2019

(51) Int. Cl.
*H04L 9/32* (2006.01)
*H04L 9/06* (2006.01)
*G06F 40/197* (2020.01)

(52) U.S. Cl.
CPC .......... *H04L 9/3247* (2013.01); *G06F 40/197* (2020.01); *H04L 9/0643* (2013.01)

(58) Field of Classification Search
CPC ....... H04L 9/3247–3257; H04L 9/0643; G06F 40/166; G06F 40/169; G06F 40/197
See application file for complete search history.

(56) References Cited

U.S. PATENT DOCUMENTS

| | | | | |
|---|---|---|---|---|
| 6,289,460 B1 * | 9/2001 | Hajmiragha | .......... | H04L 9/3247 726/28 |
| 2006/0293919 A1 * | 12/2006 | Morlet | .................... | G16H 15/00 705/2 |
| 2007/0100991 A1 * | 5/2007 | Daniels | .................... | H04L 51/34 709/224 |
| 2009/0043848 A1 * | 2/2009 | Kordun | ............... | H04L 12/1831 709/205 |
| 2013/0218829 A1 * | 8/2013 | Martinez | ................ | G06Q 10/10 707/608 |
| 2013/0262420 A1 * | 10/2013 | Edelstein | .............. | G06F 40/197 707/695 |
| 2017/0171214 A1 * | 6/2017 | Anderson | ............. | H04L 63/104 |

FOREIGN PATENT DOCUMENTS

GB  2456326 A  *  7/2009  ............. G06F 21/64

* cited by examiner

*Primary Examiner* — Trong H Nguyen
(74) *Attorney, Agent, or Firm* — FIG. 1 Patents

(57) ABSTRACT

Digital document editing techniques as part of electronic signature collection are described. These techniques support a single unified workflow in which comments and edits may be made as part of collecting an electronic signature. In this way, user and computational efficiency may be increased over conventional techniques that require initialization of the electronic signature collection workflow any time a comment or change is to be made to a digital document. Further, the comments and edits may be incorporated as part of audit trail associated with the electronic signature, thus increasing effectiveness of the electronic signature in providing supporting evidence of signature validity by documenting changes made to the digital document by one or more of the parties that sign the document.

20 Claims, 13 Drawing Sheets

DIGITAL DOCUMENT EDITING AS PART OF ELECTRONIC SIGNATURE COLLECTION

BACKGROUND

Electronic signatures have emerged as a way to increase efficiency in signature collection. Previous signature techniques before electronic signatures involved countless hours hunting down approvals and ink signatures and then to print, scan, fax or mail documents. The resulting delays frustrate customers, business partners, and employees alike and may ultimately reflect negatively on an entity that is collecting the signatures.

Although electronic signatures have made great strides in increasing user efficiency, there are still numerous challenges. In one such example, conventional systems are fractured by involving numerous separate workflows. In order to generate an electronic signature, for instance, hash data is generated for the digital document being signed and encrypted with a private key of the signer. The electronic signature may then be used to verify that the digital document is not changed after signing by comparing a hash value generated by decrypting the electronic signature using a public key with a hash value generated from the digital document. This is used to address the challenges of an ability to change content within a digital document and thus ensure that content of the digital document corresponds to the electronic signature.

However, this also limits an ability in conventional systems to collaborate and modify the digital document. For example, a human resources (HR) department may initiate an electronic signature collection workflow of a system to collect an electronic signature from a prospective employee on an employment agreement. The prospective employee, however, may not agree with one of the terms. To communicate this, the prospective employee is forced to initiate a new email back to the HR department. In conventional systems, this would also cause the human resources department to edit the digital document using a separate document editing application and then initiate the electronic signature collection workflow, again. Thus, each of these operations involve use of separate and different functionality that lies "outside" of the electronic signature collection workflow. As a result, these conventional techniques may result in user frustration and are computationally inefficient, especially when confronted with the thousands and millions of electronic signatures that may be collected by a single electronic signature system.

SUMMARY

Digital document editing techniques as part of electronic signature collection are described. These techniques support a single unified workflow in which comments and edits may be made as part of collecting an electronic signature. In this way, user and computational efficiency may be increased over conventional techniques that require initialization of the electronic signature collection workflow any time a comment or change is to be made to a digital document. Further, the comments and edits may be incorporated as part of audit trail associated with the electronic signature, thus increasing effectiveness of the electronic signature in providing supporting evidence of signature validity by documenting changes made to the digital document by one or more of the parties that sign the document.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
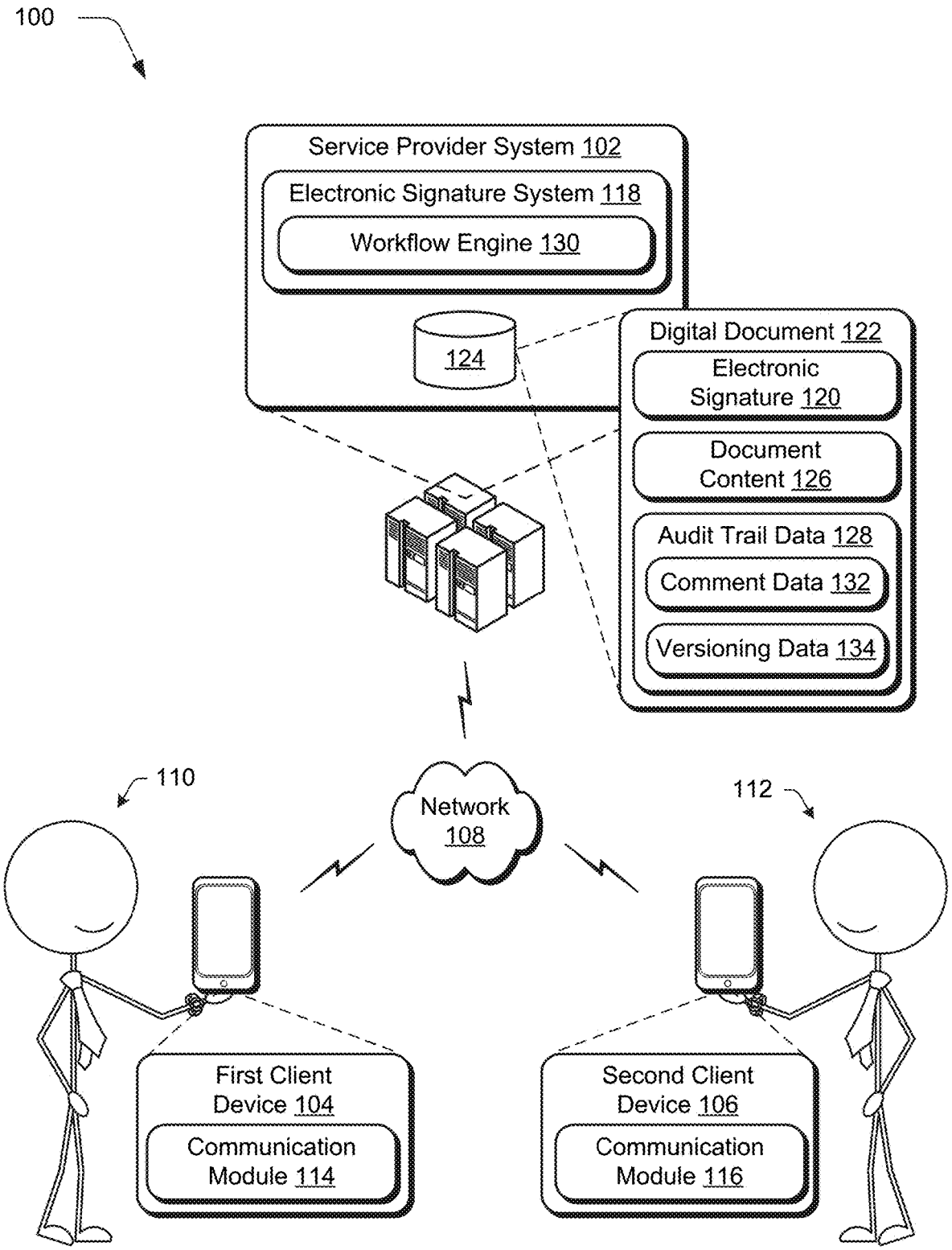
FIG. 1 is an illustration of an environment in an example implementation that is operable to employ digital document editing and electronic signature collection techniques described herein.

Conventional electronic signature collection systems typically involve use of multiple workflows to generate, comment, and finalize a digital document into a form that is suitable to collect an electronic signature. For example, a potential employee may disagree with a term in an employment agreement specified by a digital document. Conventional techniques used to address this involve separate communication workflows to provide a comment, editing workflows to make the change to the digital document, and reinitialization of an electronic signature collection workflow to again attempt to collect the electronic signature. Consequently, these conventional techniques may cause user frustration and are computationally inefficient and thus hinder operation of computing devices that implement these techniques. This may be especially problematic when confronted with the thousands and millions of electronic signatures that may be collected by a single service provider system.

Accordingly, digital document editing techniques as part of electronic signature collection are described. In these examples, a service provider system implements a single electronic signature collection workflow that supports commenting and editing of a digital document as part of collecting an electronic signature. This promotes both user efficiency as well as computational efficiency over conventional techniques that require repeated initialization of the workflow by the system in order to collect an electronic signature. Further, these techniques also support incorporation of data describing edits and comments made regarding the digital document as part of audit trail data, thereby improving effectiveness of the electronic signature in evidencing agreement and interaction of the parties with respect to the digital document.

In one example, an originator of a digital document (e.g., a "sender") initiates an electronic signature collection workflow of a service provider system. In response, the service provider system transmits a communication for receipt by a prospective signer of the digital document, e.g., an email. The email includes a link that is selectable by a client device of the prospective signer to receive the digital document, e.g., for display in a user interface.

The prospective signer in this example, however, may wish to change content within the digital document, e.g., a term of an agreement. Therefore, the prospective signer may interact within the user interface to include a comment as associated with the content to be changed in the digital document. The prospective signer, for instance, may highlight a portion of the text which causes output of a menu that is configured to receive text or other data from the prospective signer. Comment data generated based on this interaction is communicated back to the service provider system.

Upon receipt of the comment data, the service provider system is configured to send a communication to the originator automatically and without user intervention indicating availability of the content data, e.g., also via email. The originator, for instance, may also select a link in the email that permits access to the digital document and comment data. The originator may thus view the comment data via the user interface and then select functionality available via that same user interface to edit the digital document. This causes generation of editing data by the service provider system, e.g., as a new version of the digital document that includes the edit. The originator may also provide a comment in response to the prospective signer's comment as comment data that is communicated back to the service provider system.

The service provider system, in response to receiving the comment data and/or editing data involving the edits made to the digital document then transmits a communication to the prospective sender. The prospective sender may then again employ a link in the communication to view the edited digital document and comments from the originator. If the edits are agreeable to the prospective signer, the prospective signer may then select an option via the user interface to "resolve" the comment. This causes the service provider system to permit electronic signature collection from the prospective signer. In this way, the service provider system protects against unresolved comments and thus accuracy of the digital document by preventing collection of the electronic signature if there are any outstanding comments.

As part of electronic signature collection, the service provider system also generates audit trail data that is usable to evidence collection of the electronic signature. The audit trail data includes data that uniquely identifies a user, such as an email address to which the digital document was sent and/or an email address from which the digital document was received. The audit trail data also includes times, at which, actions are performed as part of collecting the electronic signature, e.g., to send, receive, sign the digital document, and so on using time stamps.

The audit trail data in this example also includes the comment data describing the comments, which may be associated with versioning data describing edits made to the digital document. As a result, the audit trail data supports increased richness over conventional techniques by describing interaction of the parties to the agreement (i.e., the originator and prospective signer) in achieving mutual agreement as evidenced by the electronic signature. Thus, this also serves to increase effectiveness of the electronic signature in binding and evidencing agreement regarding the digital document by the originator and prospective signer by describing how the digital document is edited and comments made regarding those edits. Thus, a single electronic signature collection workflow may be implemented by the service provider system that supports comments and editing as part of collecting an electronic signature that overcomes the challenges of conventional techniques. Further discussion of these and other examples are included in the following sections and are shown in corresponding figures.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a service provider system 102, a first client device 104, and a second client device 106 that are communicatively coupled, one to another, via a network 108. The first and second client devices 104, 106 are illustrated as supporting interaction with respective first and second users 110, 112. Computing devices that implement the service provider system 102, the first client device 104, and the second client device 106 may be configured in a variety of ways.

A computing device, for instance, may be configured as a desktop computer, a laptop computer, a mobile device (e.g., assuming a handheld configuration such as a tablet or mobile phone as illustrated), and so forth. Thus, computing devices may range from full resource devices with substantial memory and processor resources (e.g., personal computers, game consoles) to a low-resource device with limited memory and/or processing resources (e.g., mobile devices). Additionally, although a single computing device is shown in some instances, a computing device may be representative of a plurality of different devices, such as multiple servers utilized by a business to perform operations "over the cloud" as described in FIG. 13.

The first and second client devices 104, 106 include respective communication modules 114, 116. The communication modules 114, 116 are representative of functionality usable to access the service provider system 102 via the network 108. Examples of this functionality include web browsers, mobile applications, and so forth.

The service provider system 102 includes an electronic signature system 118 that is configured to collect an electronic signature 120 as part of a digital document 122, which is illustrated as stored in a storage device 124. The electronic signature 120 is representative of any electronic process that indicates acceptance of an agreement or record as specified by document content 126 (e.g., text, digital images) of a body of the digital document 122. The document content 126, for instance, may include terms and conditions of an agreement to be arranged between the first and second users 110, 112.

Data of the electronic signature 120 generated by the electronic signature system 118 may leverage a variety of electronic authentication techniques to uniquely identify a signer of the digital document 122. Examples of electronic authentication techniques include email address, social IDs, passwords, a phone PIN, and so forth. In one example, the electronic signature system 118 uses single factor authentication, whereas other examples of enhanced electronic signatures 120 may employ multifactor authentication to support increased security.

As part of collecting the electronic signature 120, the electronic signature system 118 is also configured to generate audit trail data 128 that demonstrates (i.e., evidences) collection of the electronic signature 120. This may include use of the unique user identifiers, identification of operations performed as part of collecting the electronic signature (e.g., where transmitted), and times at which the identified operations are performed, e.g., through use of timestamps.

Digital signatures are a type of electronic signature 120 that is generated using encryption. To do so, hash data is generated of the document content 126 by the electronic signature system 118 using a hash function. The hash data is then encrypted using a private cryptographic key associated with the user that is signing the digital document 122, thereby collecting the electronic signature 120 as a digital signature. In this way, the digital signature is bound to the document content 126 of the digital document 122.

The digital signature may then be verified using a public cryptographic key as indicating whether a change has been made to the digital document after the collection of the electronic signature 120. To do so, hash data is again generated using the hash function by the electronic signature system 118. Hash data is also generated from the electronic signature 120 by decrypting the signature using a public cryptographic key. The hash data from the signature is compared with the hash data from the digital document 122 and if a match is found the electronic signature 120 is indicated as valid. Verification may be achieved in a variety of entities, examples of which include trusted Certificate Authorities (CAs) or Trust Service Providers (TSPs). Examples of standards on digital signatures include the Digital Signature Standard (DSS) by the National Institute of Standards and Technology (NIST), eIDAS Regulation enacted by the European Parliament, and Open PGP. In this way, the electronic signature system 118 may use the electronic signature 120 to protect against changes made to the document content 126 after generation of the electronic signature 120.

As previously described, conventional techniques used to generate digital documents and collect electronic signatures are fractured, modal, and require separate access to different workflows to communicate, edit, and sign the document. As such these conventional techniques lead to user frustration and computational inefficiencies of computing devices that implement these techniques. Accordingly, a workflow engine 130 is employed by the electronic signature system 118 to generate the electronic signature 120 as part of a single electronic signature collection workflow that supports communication of comments and document edits with the workflow, which is not possible using conventional techniques and also support increased computational efficiency.

The first user 110, for instance, may select an option via a user interface to initiate an electronic signature collection workflow for the digital document 122 having document content 126. In this instance, there may be "gaps" in the document content 126 that are to be completed by the second user 112. Conventional techniques do not support collection of an electronic signature 120 at this time and are forced to "wait" for these gaps to be filled. Through use of the techniques supported by the workflow engine 130, however, the first user 110 may still initiate the workflow without waiting, thereby improving user efficiency and overcoming the limitations of conventional techniques.

For example, the first user 110 may incorporate comments as part of the digital document 122 having suggestions for the second user 112 to update the gaps in the document content 126. These comments act to initiate a comment thread by the first user 110 with the second user 112 suggesting the edits and supports subsequent comments from the second user 112 to the first user 110 indicating updates to the gaps. The first user 110 may then interact with the electronic signature system 118 to make edits to the document content 126 of the digital document 122, and then ask the second user 112 to finally sign once all the comment threads have been resolved. As part of this workflow, the workflow engine 130 captures comment data 132 and versioning data 134 describing edits made to the digital document 122 as part of the audit trail data 128. In this way, the comment data 132 and versioning data 134 may support increased richness of the audit trail data 128 over conventional techniques. Further discussion of these and other examples are included in the following section and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Electronic Signature Collection and Digital Document Editing

Figure 2:
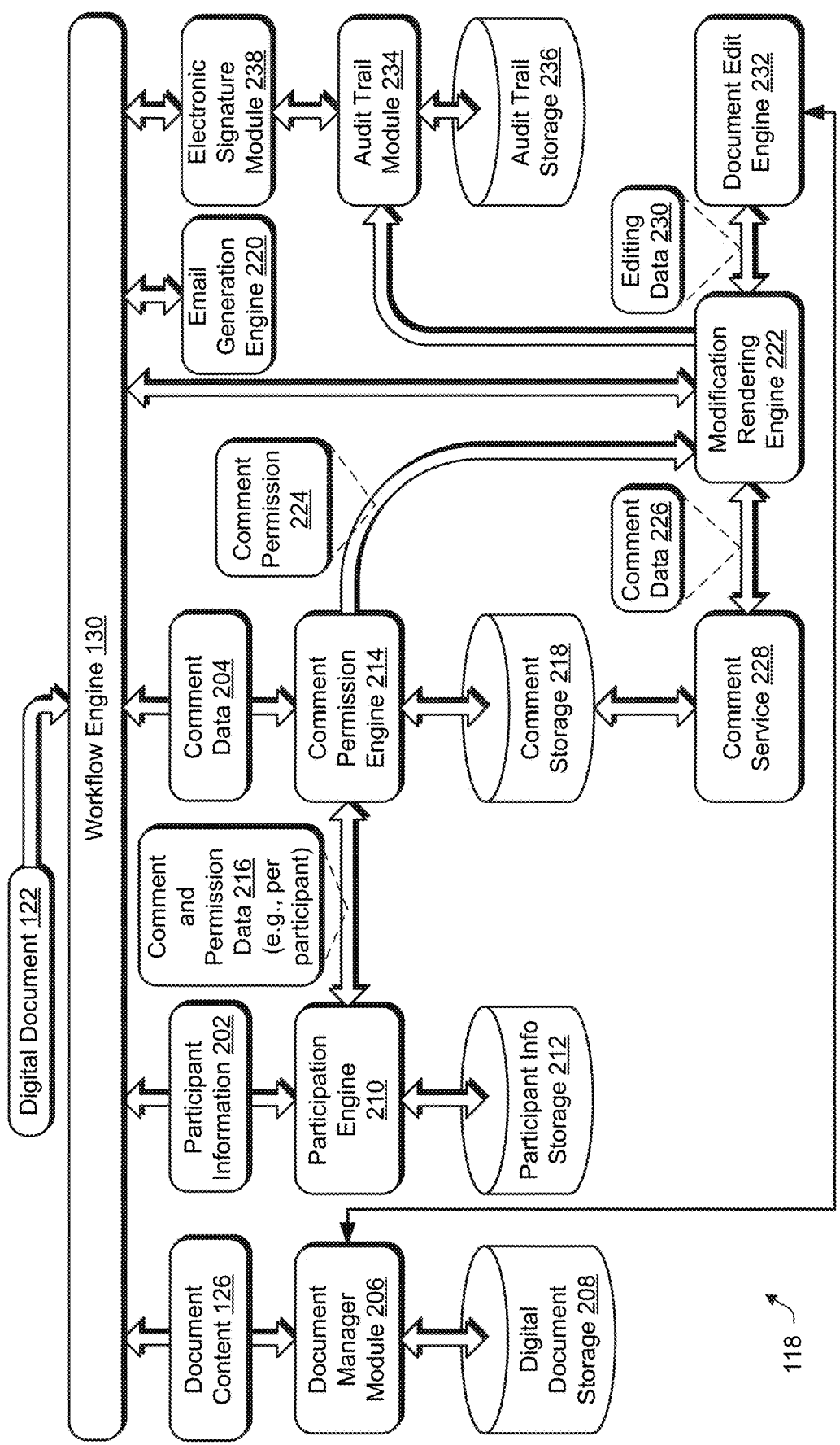
FIG. 2 depicts a system in an example implementation showing operation of a workflow engine as part of the electronic signature system of FIG. 1 in greater detail.
Figure 3:
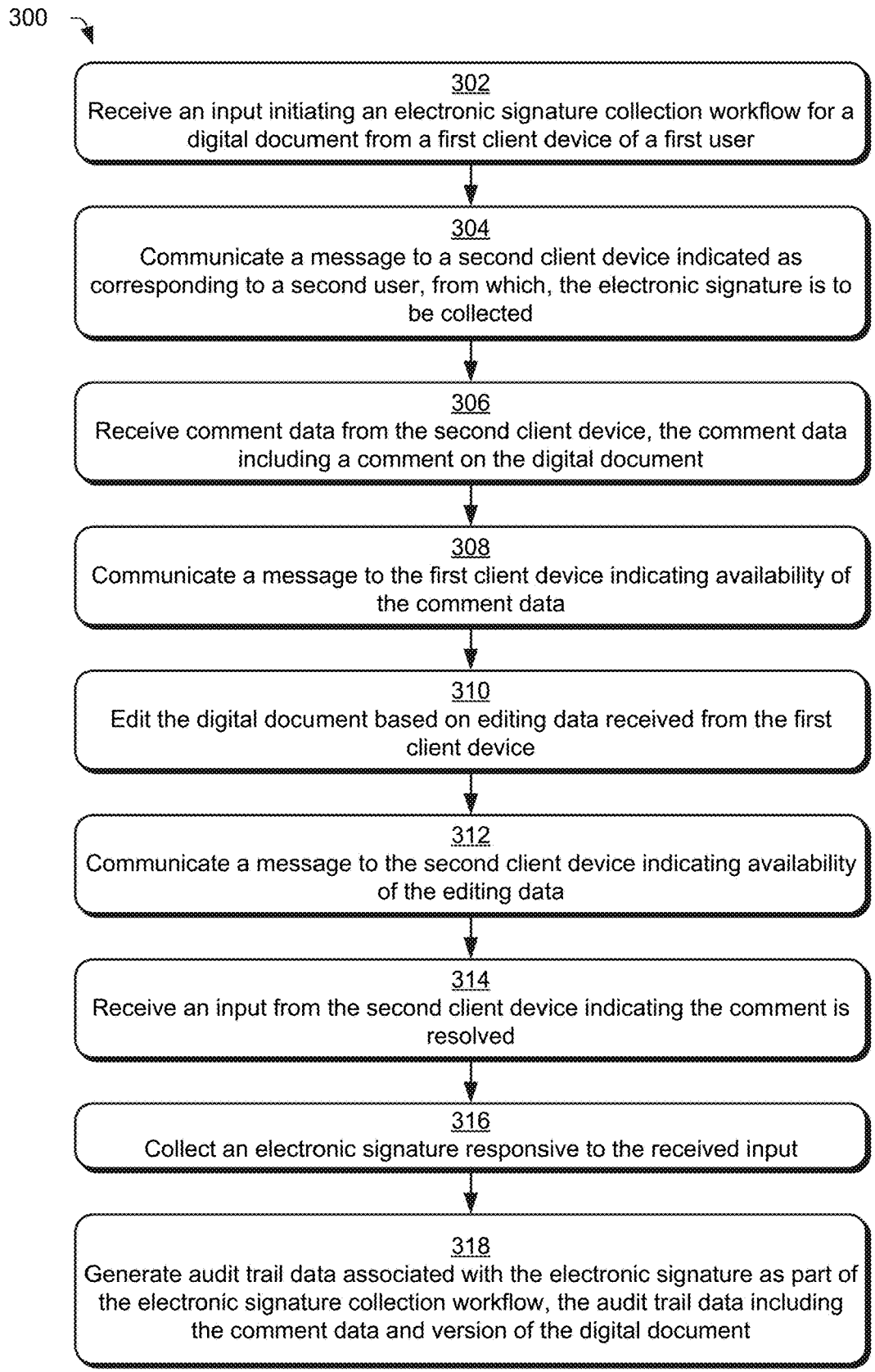
FIG. 3 is a flow diagram depicting a procedure in an example implementation in which digital document edits and comments are included as part of an electronic signature collection workflow implemented to collect an electronic signature.

FIG. 2 depicts a system in an example implementation showing operation of the workflow engine 130 as part of the electronic signature system in greater detail. FIG. 3 depicts a procedure 300 in an example implementation in which digital document edits and comments are included as part of an electronic signature collection workflow implemented to collect an electronic signature.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 2 and 3.

To begin, an input is received to initiate an electronic signature collection workflow for a digital document 122 from a first client device 104 of a first user 110 (block 302). The first user 110 in this example is an originator of the digital document 122. As part of initiating the workflow, the first user 110 interacts with a communication module 114 of the first client device 104 to communicate the digital document 122 to the electronic signature system 118. The digital document 122 includes document content 126 such as text, digital images, and so forth the form the terms and conditions of an agreement (e.g., legally) between the first user 110 and the second user 112 in this example. Other examples are also contemplated including additional parties.

In response, a workflow engine 130 of the electronic signature system 118 retrieves the digital document 122 in the example of FIG. 2. The workflow engine 130 then trisects the digital document 122 into the document content 126, participant information 202, and comment data 204. The document content 126 is provided to a document manager module 206 that is representative of functionality to manage document content 126 in digital document storage 208 device. Document content 126 as previously described forms the "body" of the digital document, e.g., which may be viewed by the first and second users 110, 112 when rendered by a display device.

The participant information 202 is managed by a participation engine 210 and is illustrated as stored in a participant info storage 212 device. The participant information 202 references the parties to the agreement specified by the document content 126. The participant info storage 212 device may include information indicating how to contact the respective first and second users 110, 112, such as email addresses, social network system IDs, instant messaging identifiers, and so forth and thus how to uniquely identify the users.

A comment permission engine 214 is configured to interact with the participation engine 210 to obtain comment and permission data 216, e.g., per participant, which may be stored in comment storage 218 device. The comment and permission data 216, for instance, may specify permissions set by the first user 110 for the second user 112 as part of interacting with the digital document 122.

Figure 4:
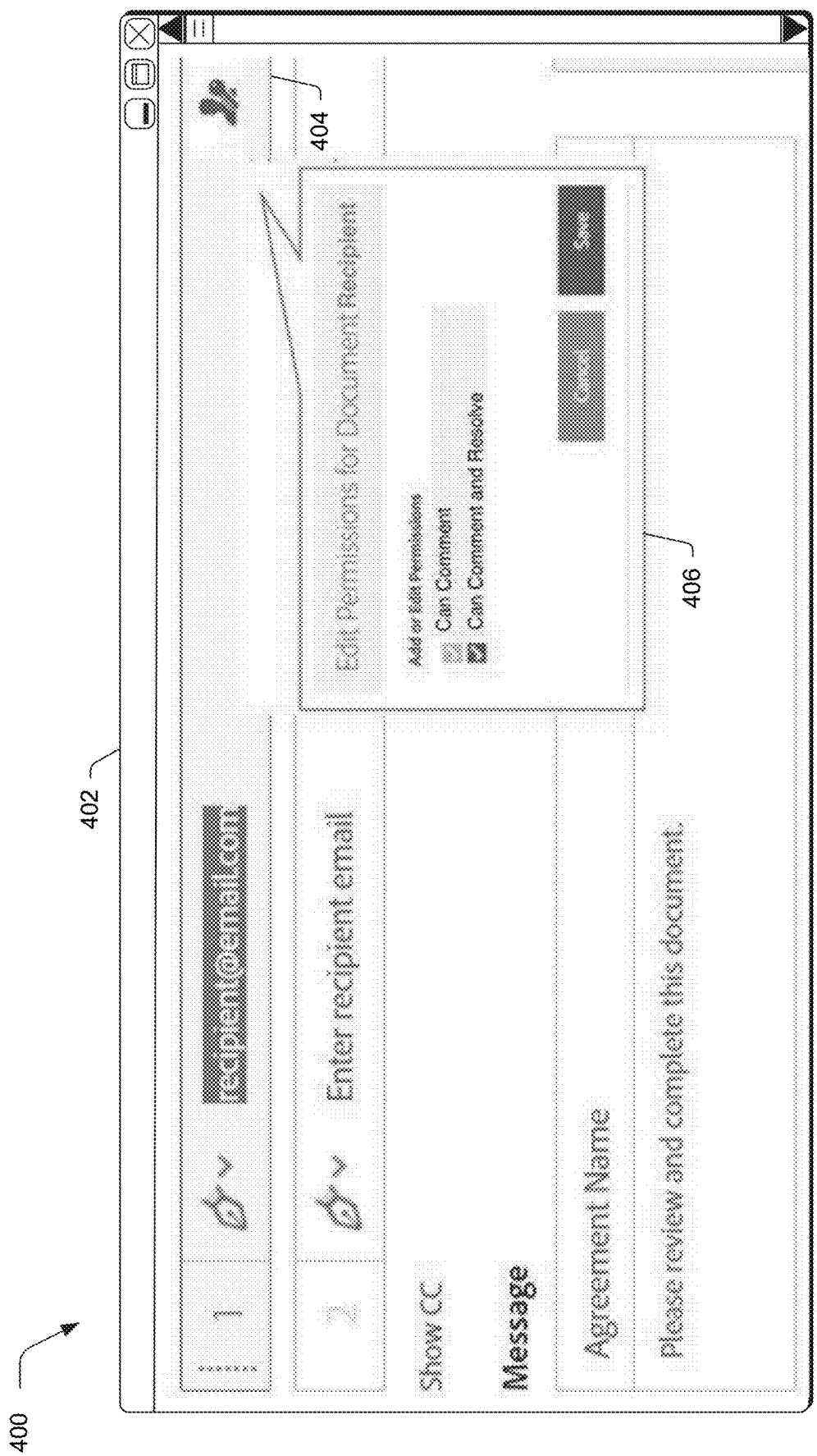
FIG. 4 depicts an example implementation of setting permissions for a document recipient.

FIG. 4 depicts an example implementation 400 of setting permissions for a document recipient. In this example, a user interface 402 displays an email address of a recipient that is to sign the digital document 122 using an electronic signature. The user interface 402 includes an option 404 that is user selectable to cause output of a menu 406 in the user interface 402 that indicates which permissions are to be specified for the second user 112 as the recipient. Illustrated examples include "can comment" and "can comment and resolve." Selection of the "can comment" example permits the second user 112 to enter comments as further detailed below.

Selection of the "can comment and resolve" permits the second user 112 to enter comments as well as resolve those comments, which may be used as basis to control when collection of the electronic signature 120 is permitted by the system as further detailed below. If none of these options are selected, a user may view but not comment or resolve, which may be used to share with entities that are not party to the digital document 122 but are to review the document, e.g., a lawyer, administrative assistant, and so forth.

In response to receipt of the digital document 122, control returns to the workflow engine 130 which then communicates a message to the second client device 106 indicated as corresponding to a second user 112, from which, the electronic signature is to be collected (block 304). The workflow engine 130, for instance, may obtain the participant information 202 from the participation engine 210 and from this, cause an email generation engine 220 to generate an email or other message to be received by the second client device 106 based on the participant information 202.

Figure 5:
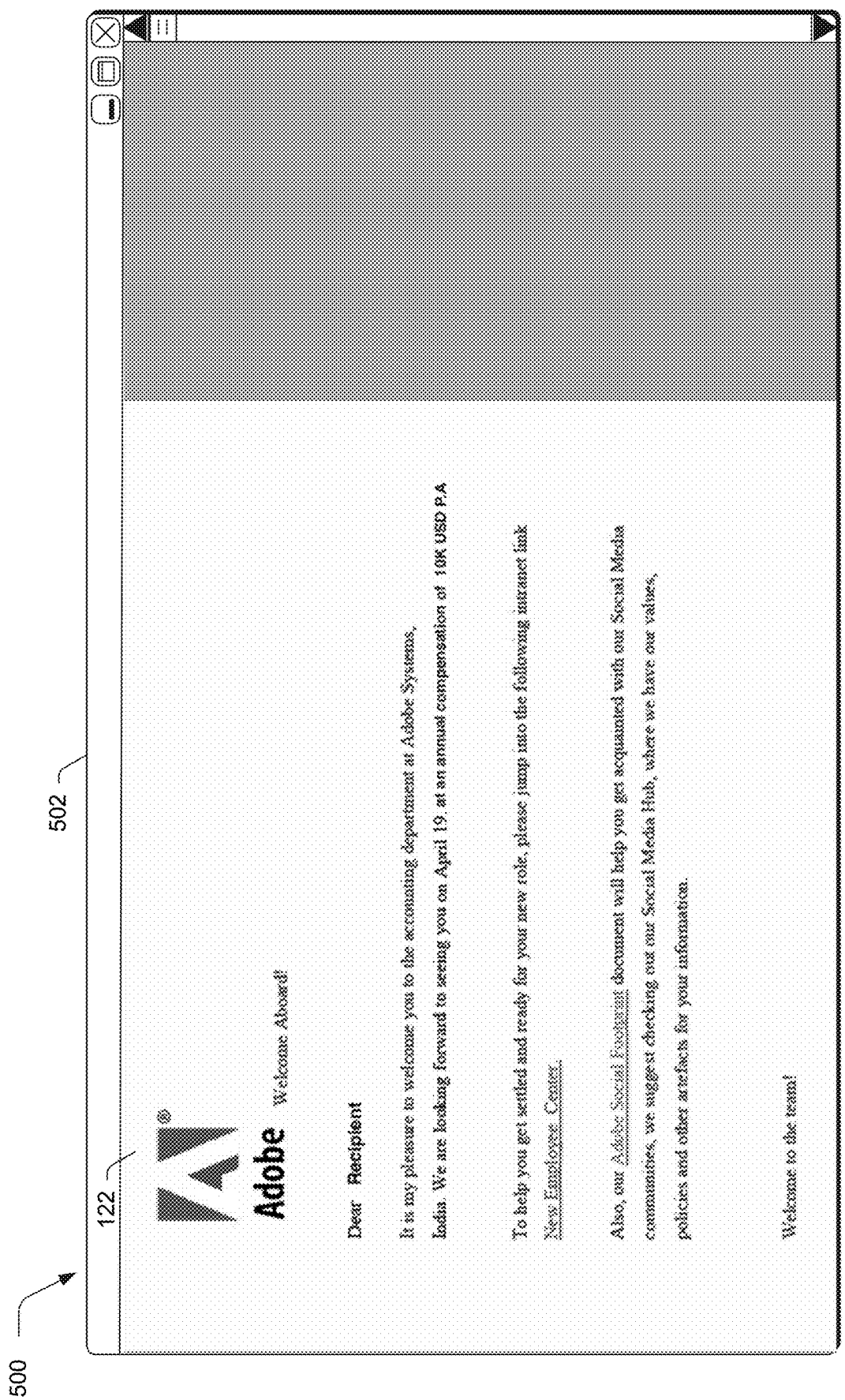
FIG. 5 depicts an example implementation of a message indicating availability of a digital document for receipt of an electronic signature.

The message indicates availability of the digital document 122 for receipt of an electronic signature. The message, for instance, may include a link that is selectable to obtain the digital document 122 for viewing in a user interface 502 at the second client device 106, an example 500 of which is illustrated in FIG. 5. In this example, the digital document 122 is an employment agreement, although other examples are also contemplated.

Comment data 204 is then collected from the second client device 106 that describes a comment made regarding the digital document 122 (block 306). The second user 112, upon viewing the digital document 122 in this example, may wish to have a change made to one or more of the terms in the document content 126. To do so, the workflow engine 130 employs a modification rendering engine 222 which is configured to bridge a gap between maintenance of the document content 126 by the document manager module 206 and a collaboration service of the electronic signature system 118 to collect the electronic signature 120. The modification rendering engine 222 obtains comment permission 224 data from the comment permission engine 214 indicative of which types of comment functionality is made available to the second user 112 as previously described. The modification rendering engine 222 also obtains comment data 226 from a comment service 228 that is communicatively coupled to the comment storage 218.

Figure 6:
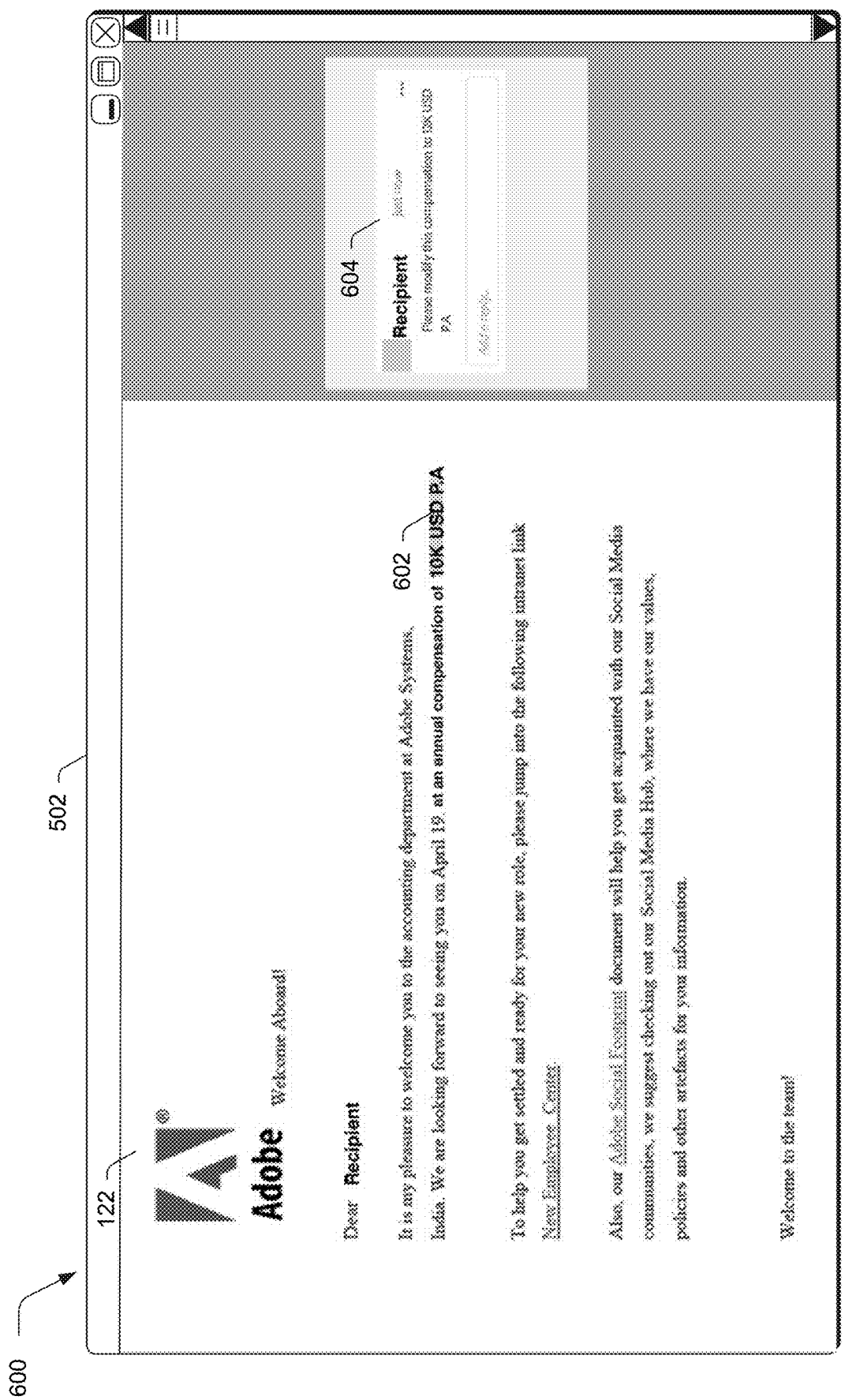
FIG. 6 depicts an example implementation of generating comment data that includes a comment relating to the digital document of FIG. 1.

FIG. 6 depicts an example implementation 600 of generating comment data that includes a comment relating to the digital document 122. In this example, a user input is received via the user interface 502 as selecting a portion of text 602, e.g., via a cursor control device, gesture, spoken utterance, and so forth. This causes output of a comment menu 604 in the user interface simultaneously as linked to the selected portion that is configured to receive text or other content from the second user 112 as part of the comment. By linking the comment menu 604 to the selected portion of text, navigation through the digital document 122 may cause output of corresponding comments relating to respective portions of the digital document 122 as displayed in the user interface 502.

Figure 7:
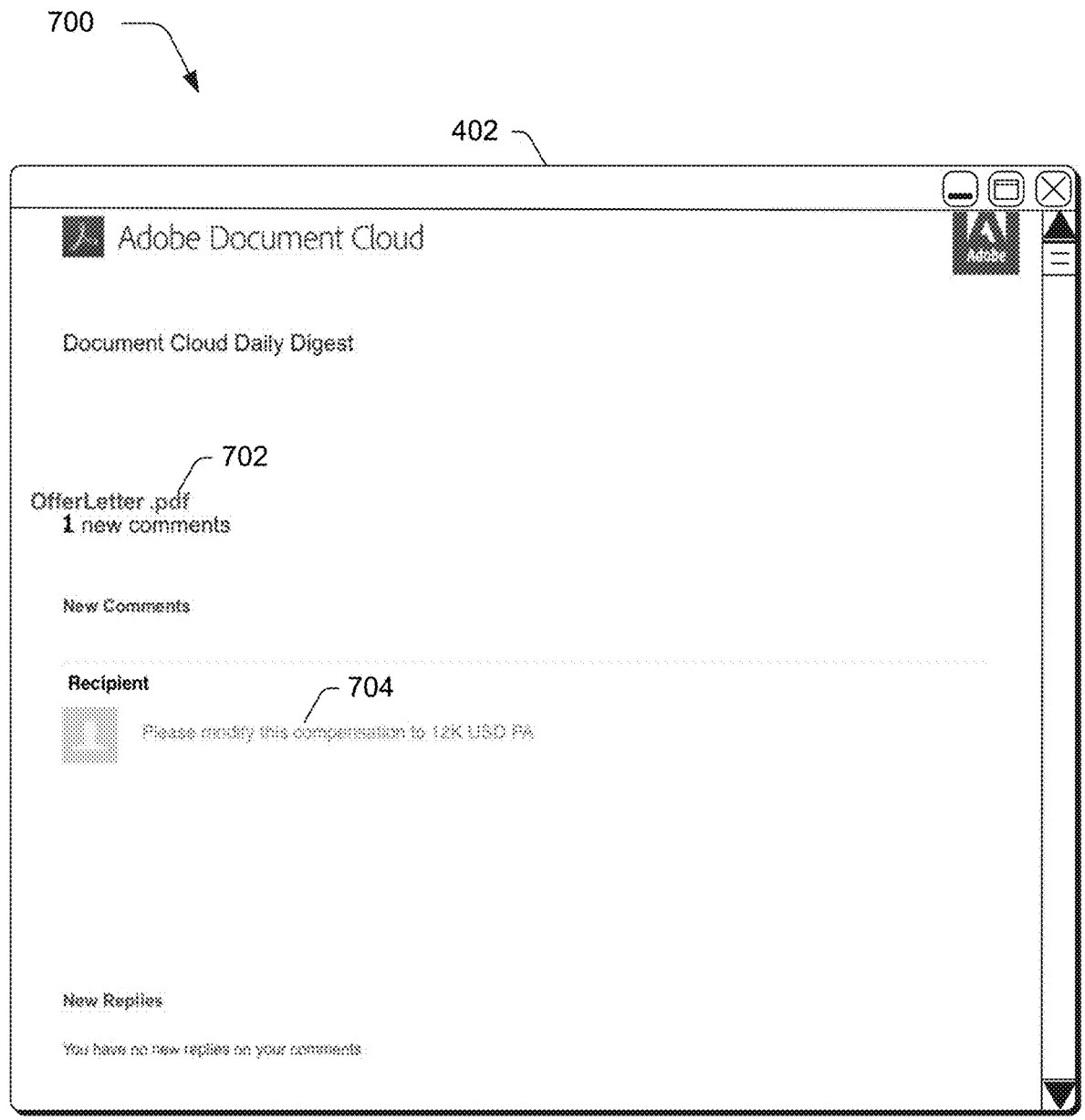
FIG. 7 depicts an example implementation of a message that includes a link that is selectable to view details of comment data.

Completion of the comment (i.e., entry of text and content as the comment data) causes control to revert back to the workflow engine 130. The workflow engine 130 then automatically and without user intervention communicates a message to the first client device 104 indicating availability of the comment data (block 308), e.g., through use of the email generation engine 220. The message, like before, may include a link that is selectable to view details about the comment data, an example 700 of which is shown in FIG. 7. In this example, the user interface 402 of the first client device 104 includes a link 702 to the digital document 122 as well as comment data 704 generated by the second user 112 through interaction with the user interface 502 of FIG. 6.

Figure 8:
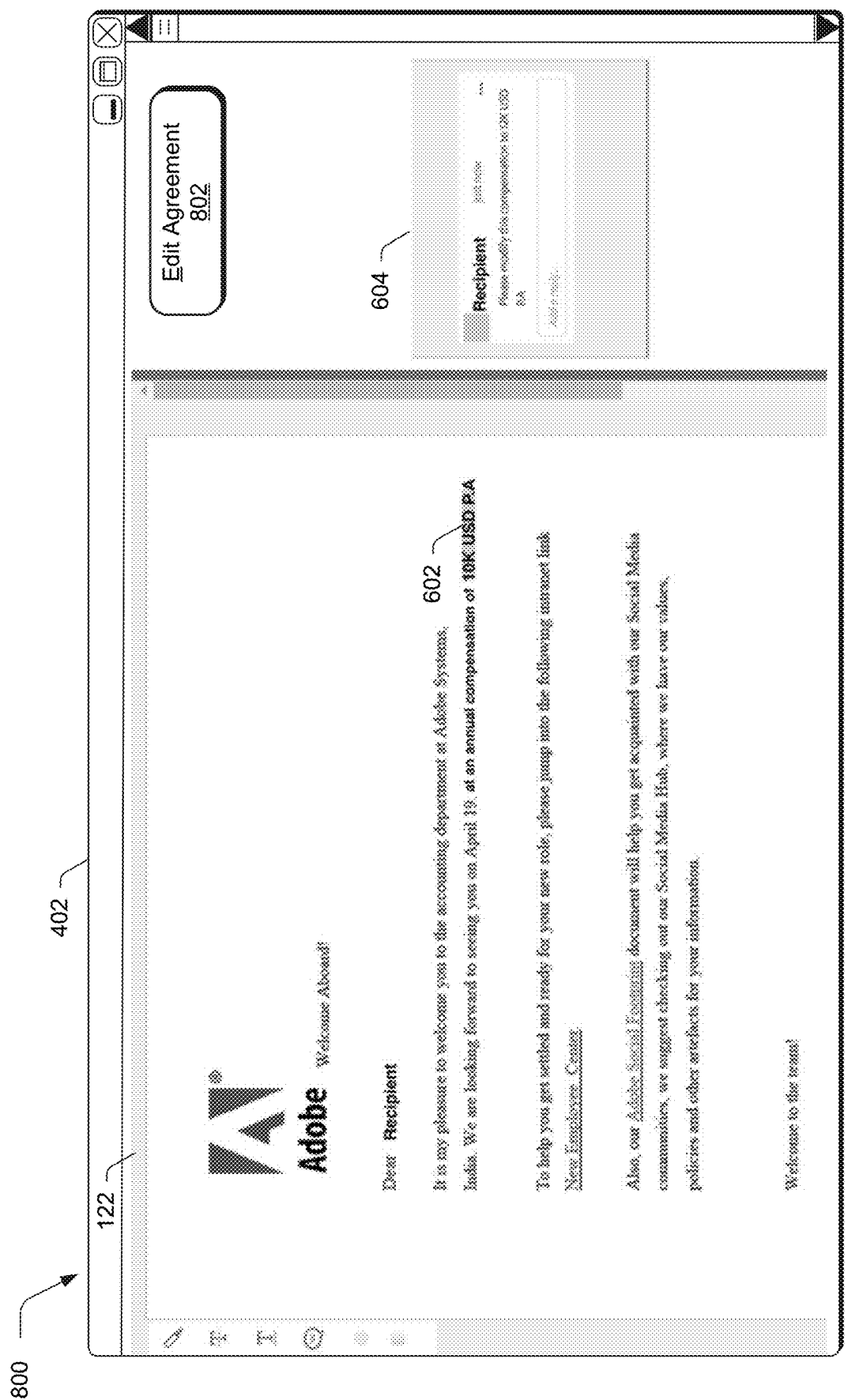
FIG. 8 depicts an example implementation in which the link of FIG. 7 is selected to cause output of the digital document in a user interface.

FIG. 8 depicts an example implementation 800 in which the link 702 of FIG. 7 is selected to cause output of the digital document 122 in the user interface 402. The digital document 122 includes the selected portion of text 602 (e.g., as highlighted) as well as the comment data of the comment menu 604. The user interface 402 also includes an option 802 in this example to edit the digital document 122. In an implementation, this functionality is made available solely to an originator of the digital document 122 and not to other parties. This is implemented in this example to preserve sanctity of the document content 126 from being edited without the originator knowing this occurred. Other examples are also contemplated in which changes by other parties (e.g., the second user 112) are permitted and tracked by the electronic signature system 118.

Figure 9:
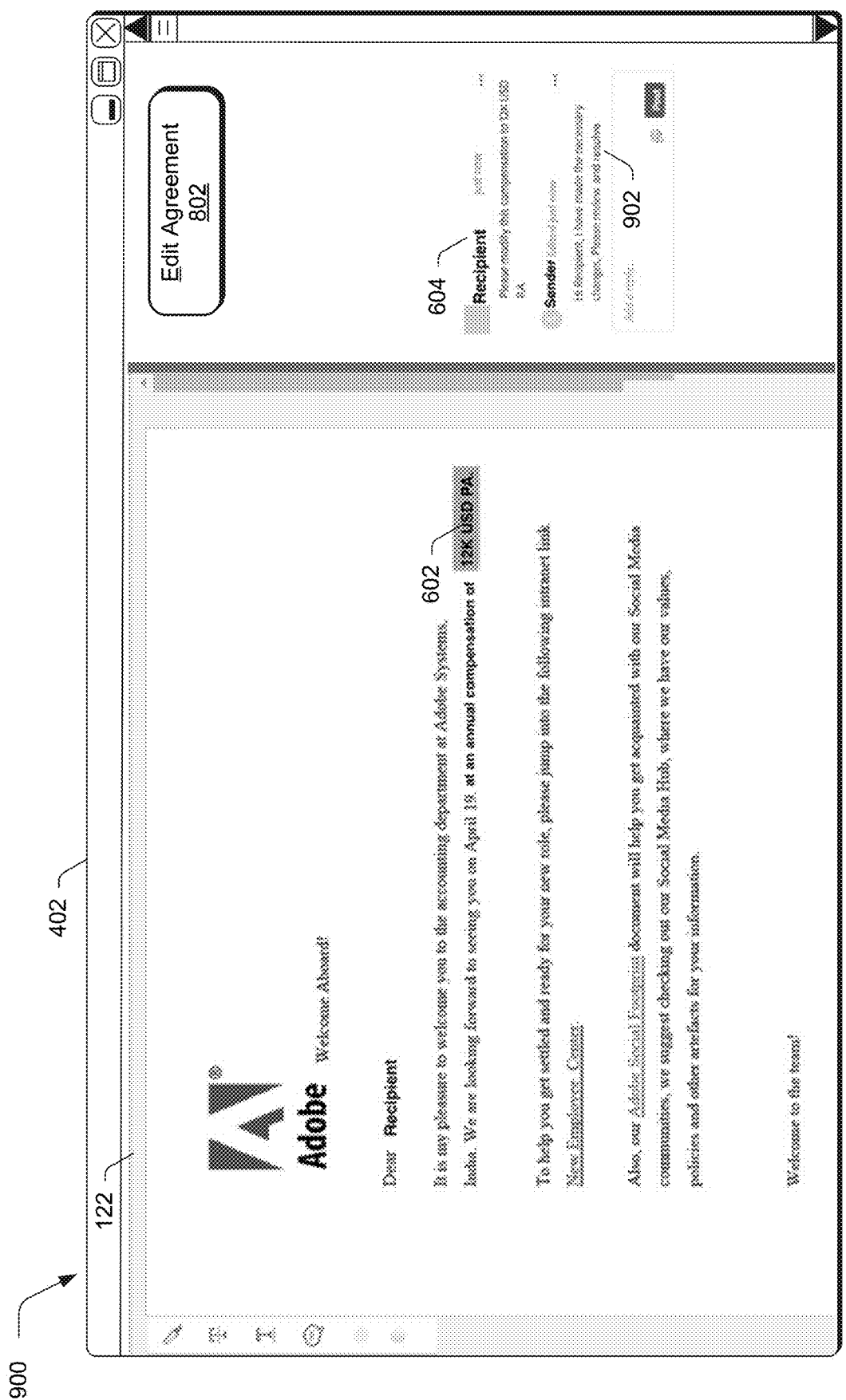
FIG. 9 depict an example implementation in which an option in a user interface is selected to edit the digital document of FIG. 1.

FIG. 9 depict an example implementation 900 in which the option 802 in the user interface 402 of the first client device 104 is selected to edit the digital document 122. Again, in this example the first user 110 is an originator of the digital document 122 and thus is given control of what document content 126 is included. Therefore, selection of the option 802 causes the workflow engine 130 to pass control again to the modification rendering engine 222.

Through user interaction with the modification rendering engine 222, editing data 230 is generated which is passed to a document edit engine 232 to make edits to the document content 126 of the digital document 122 as maintained by the document manager module 206. In this way, the digital document is edited based on editing data received from the first client device (block 310). In the illustrated example, the selected text 602 is changed to increase an amount of compensation. A comment is also received in this example from the first user 110 via the user interface 402 in reply to the comment of the comment menu 604 as input by the second user 112.

Figure 10:
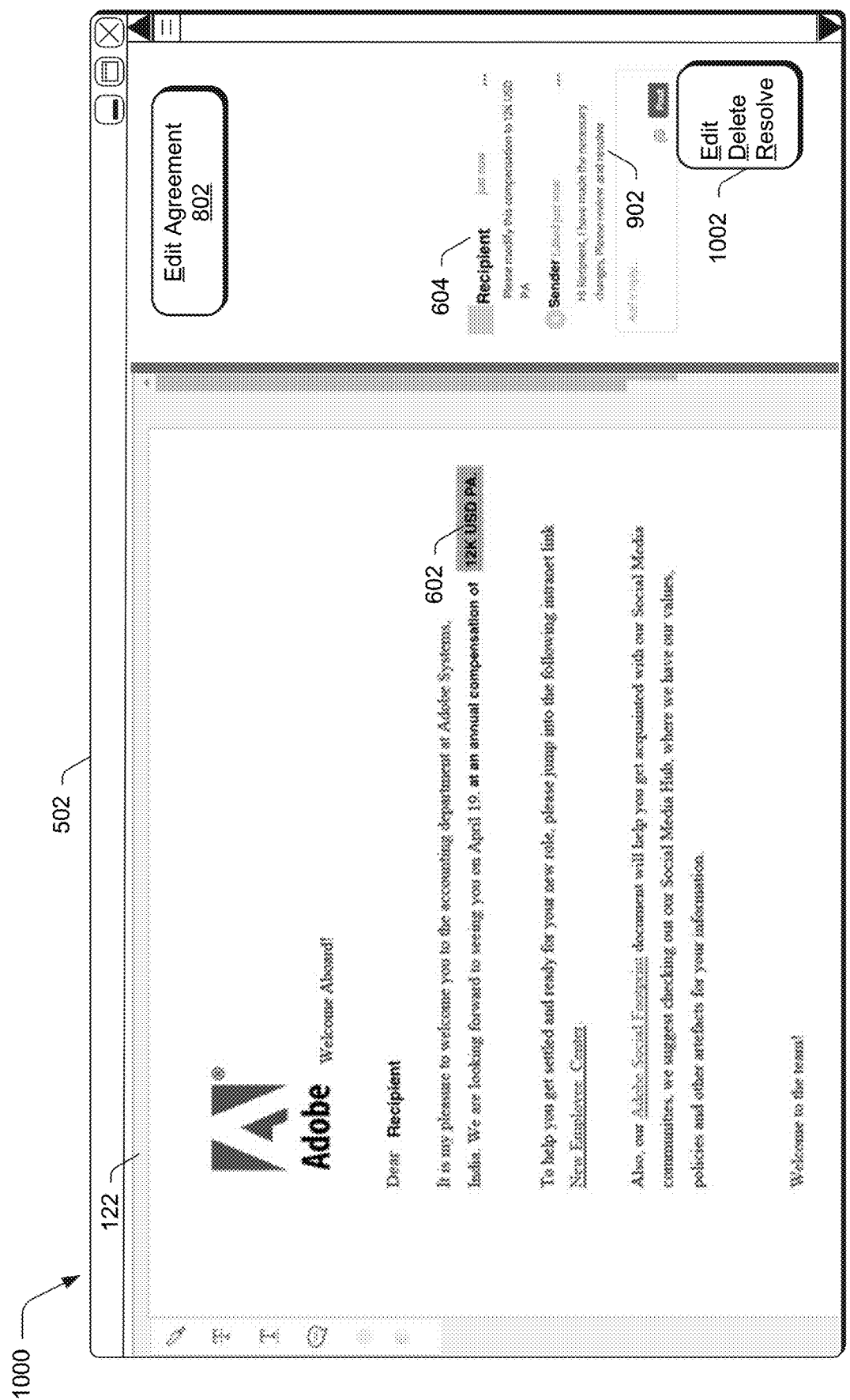
FIG. 10 depicts an example implementation in which an option is output via a user interface to resolve a comment.

Upon completion of the comment and edits, control again passes back to the workflow engine 130 to cause the email generation engine 220 to communicate a message to the second client device 106 indicating availability of the editing data 230 (block 312), i.e., that the digital document 122 has been edited. As before, the second user 112 may select a link in the message to cause output of the digital document 122 in a user interface 502 as shown in an example implementation 1000 of FIG. 10. The user interface 502 includes the change to the selected text 602 the comments of the comment menu 604, and comment 902.

An option 1002 is included in the user interface 502 that is selectable by the second user 112 to initiate an input indicating the comment is resolved (block 314). The option 1002, for instance, may include "resolve" indicating that a subject matter of the comment of the comment menu 604, and any subsequent comments 902 of a comment thread spawned by the comment, has been completed to the satisfaction of the second user 112. This may also be included as part of audit trail data as further described below.

An electronic signature 120 is then permitted to be collected responsive to the received input (block 316) by the workflow engine 130. The workflow engine 130 in this example is configured to prevent collection of the electronic signature until each comment has been resolved. In this way, the workflow engine 130 protects the digital document from having any subsequent issues regarding whether parties to the digital document are in agreement.

Figure 11:
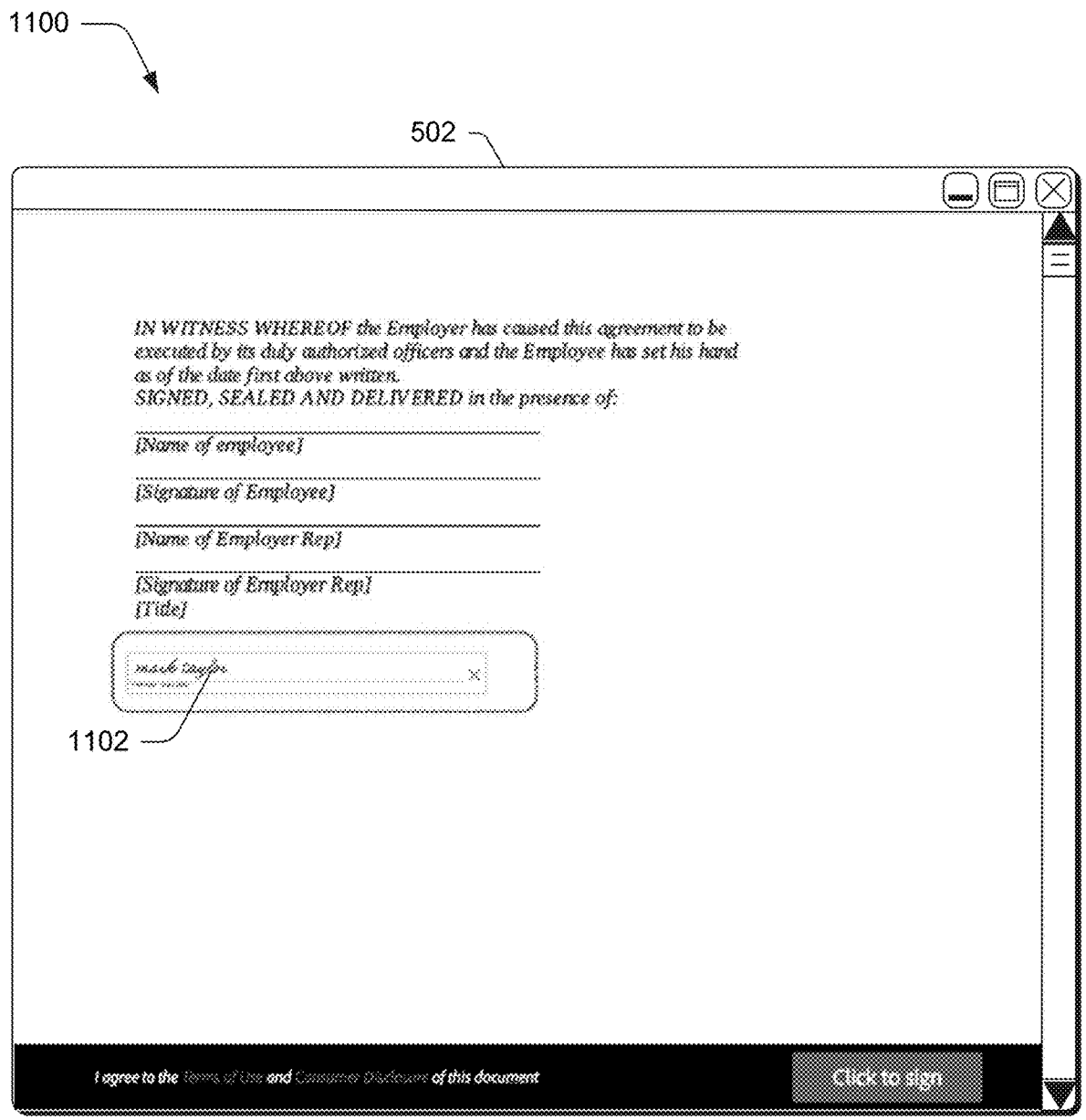
FIG. 11 depicts an example implementation in which a signature is collected via a user interface.

FIG. 11 depicts an example implementation 1100 in which the second user 112 inputs a signature 1102 causing generation of the electronic signature 120. The second user 112, for instance, may draw a signature 1102 using a cursor control device, touchscreen functionality, text (e.g., typing "/Mark Taylor/"), and so forth. In response, the workflow engine creates the electronic signature 120, which may be configured in a variety of ways.

The electronic signature 120 is representative of any electronic process that indicates acceptance of an agreement or record as specified by document content 126 (e.g., text, digital images) of a body of the digital document 122. The document content 126, for instance, may include terms and conditions of an agreement to be arranged between the first and second users 110, 112.

Data of the electronic signature 120 generated by the electronic signature system 118 may leverage a variety of electronic authentication techniques to uniquely identify a signer of the digital document 122. Examples of electronic authentication techniques include email address, social IDs, passwords, a phone PIN, and so forth. This may include single factor authentication or multifactor authentication.

Digital signatures are a type of electronic signature 120 that is generated using encryption. To do so, hash data is generated of the document content 126 by the electronic signature system 118 using a hash function. The hash data is then encrypted using a private cryptographic key associated with the user that is signing the digital document 122, thereby collecting the electronic signature 120 as a digital signature. In this way, the digital signature is bound to the document content 126 of the digital document 122.

The digital signature may then be verified using a public cryptographic key as indicating whether a change has been made to the digital document after the collection of the electronic signature 120. To do so, hash data is again generated using the hash function by the electronic signature system 118. Hash data is also generated from the electronic signature 120 by decrypting the signature using a public cryptographic key. The hash data from the signature is compared with the hash data from the digital document 122 and if a match is found the electronic signature 120 is indicated as valid. Verification may be achieved in a variety of entities, examples of which include trusted Certificate Authorities (CAs) or Trust Service Providers (TSPs). Examples of standards on digital signatures include the Digital Signature Standard (DSS) by the National Institute of Standards and Technology (NIST), eIDAS Regulation enacted by the European Parliament, and Open PGP. In this way, the electronic signature system 118 may use the electronic signature 120 as a digital signature to protect against changes made to the document content 126 after generation of the electronic signature 120.

Figure 12:
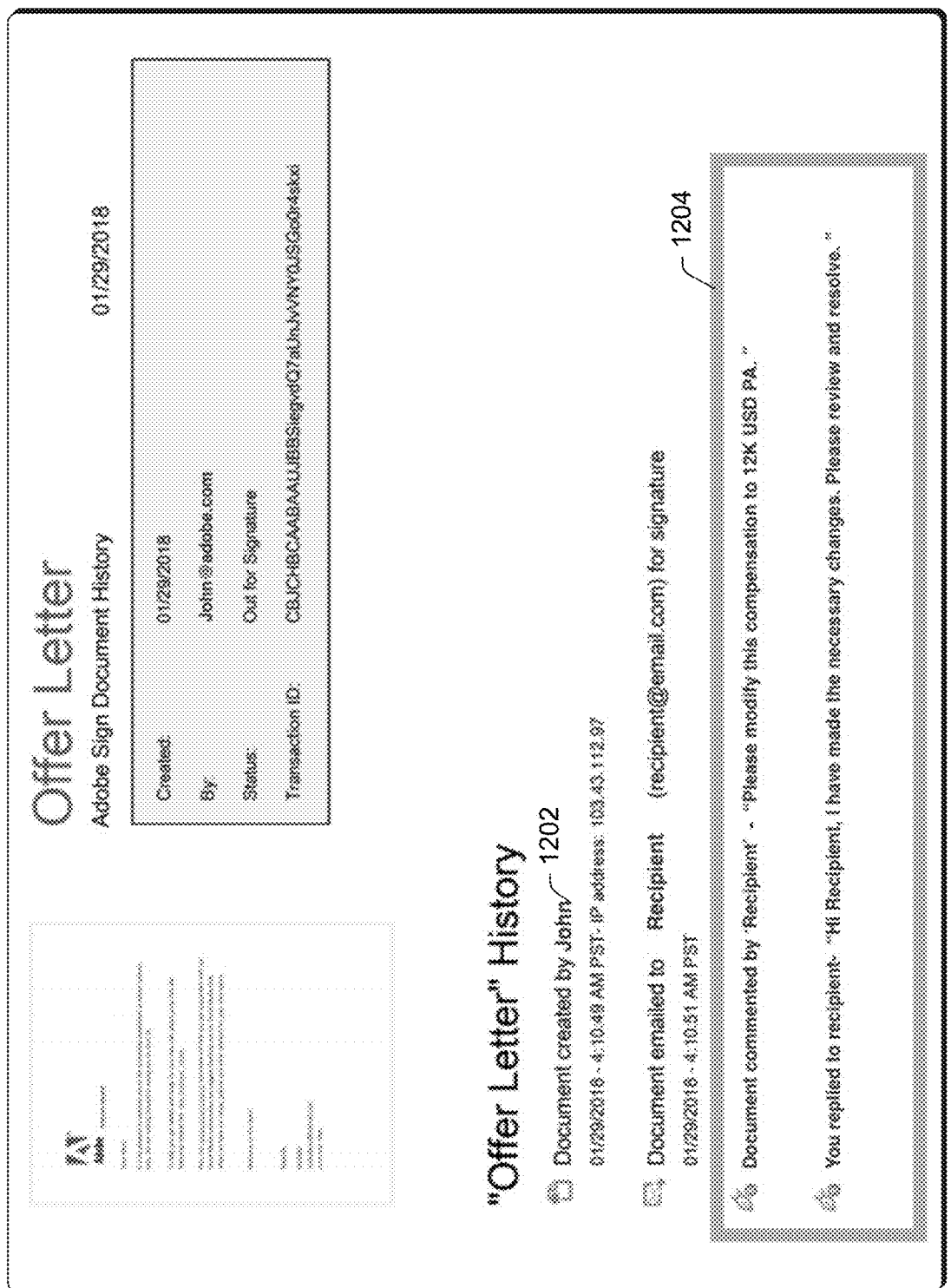
FIG. 12 depicts an example implementation of a message indicating completion of an electronic signature collection workflow.

FIG. 12 depicts an example implementation 1200 of a message indicating completion of the electronic signature collection workflow. Once the electronic signature is generated, the workflow engine 130 causes the email generation engine 220 to send messages to the first and second users 110, 112 indicating that the electronic signature collection workflow has been completed. An example of this is shown in the user interface 402 of the first client device 104. The user interface 402 includes a link 1202 to the signed digital document as well as comment data 1204 including the comments made during the electronic signature collection workflow.

As part of the electronic signature collection workflow, audit trail data 128 associated with the electronic signature 120 is also generated by the electronic signature system 118. The audit trail data 128 in this example includes the comment data 132 and corresponding versioning data 134 indicative of the editing of the digital document 122 (block 318). The modification rendering engine 222, for instance, may push the comment data and editing data to the audit trail module 234 for inclusion as part of audit trail data 236 as these operations occur, e.g., by an electronic signature module 238 to generate an electronic signature. Therefore, the audit trail data may include data identifying users and operations performed in collecting the digital signature using timestamps as well as comments and edits made as part of collecting the electronic signature, which was not possible using conventional techniques. As a result, the audit trail data has increased richness over conventional techniques as describing interaction of the parties to an agreement with each other as evidencing their intent to agree to the terms and conditions of the digital document 122.

Example System and Device

Figure 13:
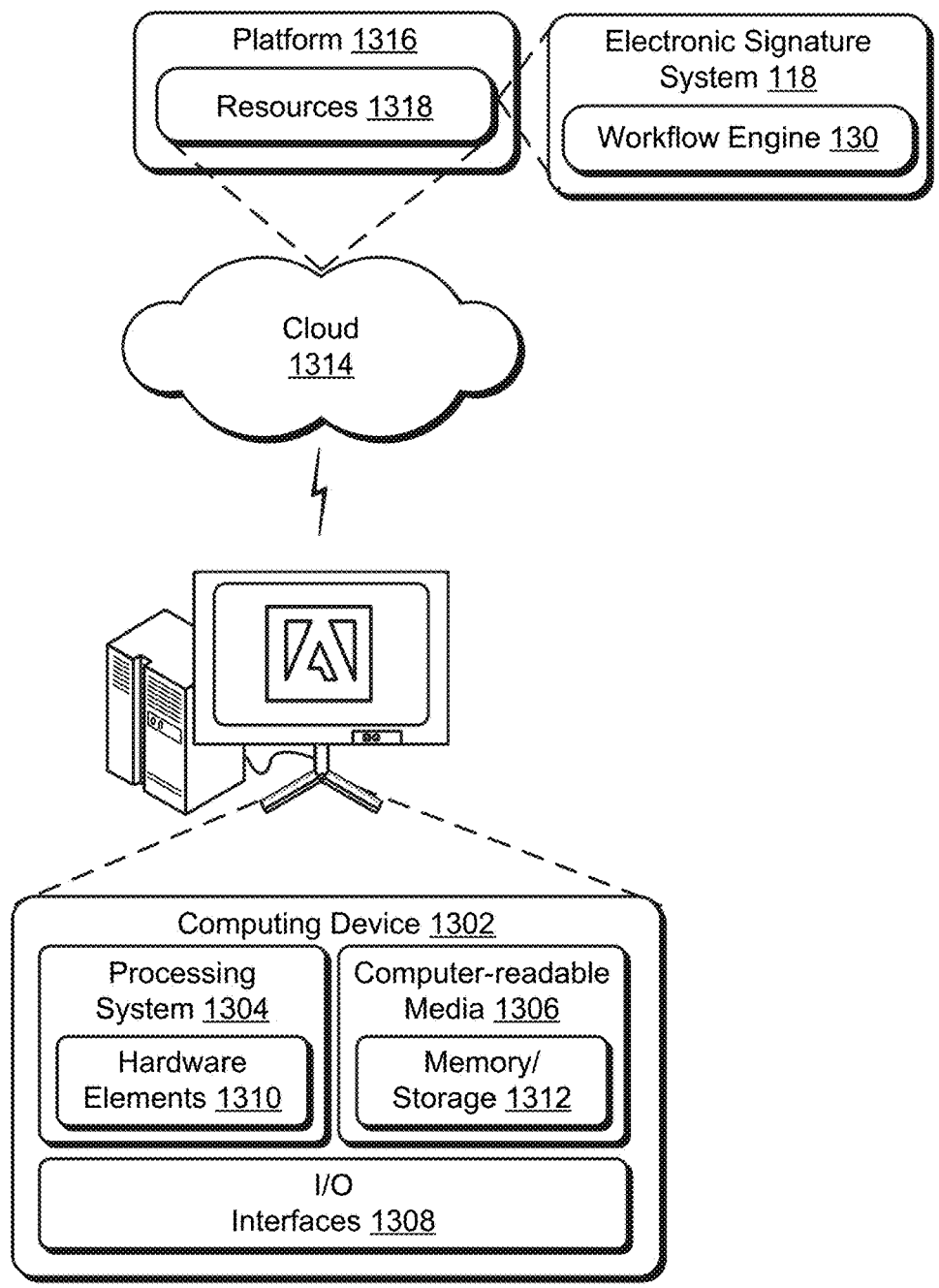
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the electronic signature system 118 and workflow engine 130. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules and engines. Generally, such modules and engines include routines, programs, objects, elements, components, data structures, and so forth that perform particular tasks or implement particular abstract data types. The terms "module," "functionality," "engine," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium electronic signature environment, a system comprising:
   a document manager module implemented at least partially in hardware of a computing device to maintain a digital document in a storage device;
   a comment permission engine implemented at least partially in hardware of the computing device to collect comment data describing a comment made in relation to the digital document;
   a document edit engine implemented at least partially in hardware of the computing device to edit the digital document using edit data obtained in response to the comment data;
   an audit trail module implemented at least partially in hardware of the computing device to generate audit trail data describing collection of an electronic signature for the digital document including data that identifies a user and actions performed via a network as part of collecting the electronic signature as part of a single electronic signature collection workflow; and
   a modification rendering engine implemented at least partially in hardware of the computing device to:
      fetch the digital document from the document manager module and direct the document edit engine to edit the digital document to create a version of the digital document based on the edit data;
      prevent collection of the electronic signature until the comment is indicated as resolved by an originator of the comment; and
      direct the audit trail module to include the comment data, the edit data, and the version of the digital document as part of the audit trail data describing collection of the electronic signature as part of the single electronic signature collection workflow.

2. The system as described in claim 1, wherein entered by highlighting a portion of text of the digital document which causes output of a menu that is configured to receive the comment.

3. The system as described in claim 1, wherein the electronic signature is configured to verify that a change has not been made to the digital document after the electronic signature is collected.

4. The system as described in claim 3, wherein the electronic signature is collected by generating hash data of the digital document and encrypting the hash data using a private cryptographic key as the electronic signature, the electronic signature verifiable using a public cryptographic key as indicating whether a change has been made to the digital document after the collection of the electronic signature.

5. The system as described in claim 1, wherein the audit trail data identifies a user associated with the electronic signature, a time at which the electronic signature is collected, and a time at which the comment is made.

6. The system as described in claim 5, wherein the audit trail data identifies the user associated with the electronic signature using an email address, to which, the digital document is communicated and from which the comment data is received.

7. The system as described in claim 5, wherein the audit trail data identifies a time at which the comment is indicated as resolved.

8. In a digital medium electronic signature environment, a system comprising:
   a document manager module implemented at least partially in hardware of a computing device to maintain a digital document in a storage device;
   a comment permission engine implemented at least partially in hardware of the computing device to collect comment data specifying a comment to the digital document;
   an electronic signature module implemented at least partially in hardware of the computing device to collect an electronic signature for the digital document;
   an audit trail module implemented at least partially in hardware of the computing device to generate audit trail data describing actions performed via a network as part of the collection of the electronic signature; and
   a modification rendering engine implemented at least partially in hardware of the computing device to:
      prevent the collection of the electronic signature by the electronic signature module until receipt of an indication from the comment permission engine that the comment is resolved by an originator of the comment; and
      direct the audit trail module to include the comment data and the indication as part of the audit trail data.

9. The system as described in claim 8, wherein the comment entered by highlighting a portion of text of the digital document which causes output of a menu that is configured to receive the comment.

10. The system as described in claim 8, wherein the electronic signature is configured to verify that a change has not been made to the digital document after the electronic signature is collected.

11. The system as described in claim 10, wherein the electronic signature is collected by generating hash data of the digital document and encrypting the hash data using a private cryptographic key as the electronic signature, the electronic signature verifiable using a public cryptographic key as indicating whether a change has been made to the digital document after the collection of the electronic signature.

12. The system as described in claim 8, wherein the audit trail data identifies a user associated with the electronic signature, a time at which the electronic signature is collected, and a time at which the comment is made.

13. The system as described in claim 12, wherein the audit trail data identifies the user using an email address, to which, the digital document is communicated and from which the comment data is received.

14. The system as described in claim 8, wherein the audit trail data identifies a time at which the comment is indicated as resolved.

15. In a digital medium electronic signature environment, a system comprising:
   a document manager module implemented at least partially in hardware of a computing device to maintain a digital document in a storage device;
   a comment permission engine implemented at least partially in hardware of the computing device to collect comment data specifying a comment to the digital document;
   a document edit engine implemented at least partially in hardware of the computing device to edit the digital document using edit data obtained in response to the comment data;
   an electronic signature module implemented at least partially in hardware of the computing device to collect an electronic signature for the digital document;
   an audit trail module implemented at least partially in hardware of the computing device to generate audit trail data describing the collection of the electronic signature as part of a single electronic signature collection workflow; and
   a modification rendering engine implemented at least partially in hardware of the computing device to:
      prevent collection of the electronic signature by the electronic signature module until receipt of an indication from the comment permission engine that the comment is resolved by an originator of the comment; and
      direct the audit trail module to include the comment data, the indication, and version of the digital document as part of the audit trail data generated as part of the single electronic signature collection workflow.

16. The system as described in claim 15, wherein the electronic signature is configured to verify that a change has not been made to the digital document after the electronic signature is collected.

17. The system as described in claim 16, wherein the electronic signature is collected by generating hash data of the digital document and encrypting the hash data using a private cryptographic key as the electronic signature, the electronic signature verifiable using a public cryptographic key as indicating whether a change has been made to the digital document after collection of the electronic signature.

18. The system as described in claim 15, wherein the audit trail data identifies a user associated with the electronic signature, a time at which the electronic signature is collected, and a time at which the comment is made.

19. The system as described in claim 18, wherein the audit trail data identifies the user using an email address, to which, the digital document is communicated and from which the comment data is received.

20. The system as described in claim 15, wherein the audit trail data identifies a time at which the comment is indicated as resolved.

* * * * *